US010374255B2

(12) United States Patent
Nakano et al.

(10) Patent No.: US 10,374,255 B2
(45) Date of Patent: Aug. 6, 2019

(54) NONAQUEOUS ELECTROLYTE SECONDARY BATTERY

(71) Applicant: TOYOTA JIDOSHA KABUSHIKI KAISHA, Toyota-shi, Aichi (JP)

(72) Inventors: Tomohiro Nakano, Toyota (JP); Satoshi Goto, Toyota (JP); Tomohide Sumi, Toyota (JP); Hideki Sano, Kadoma (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 496 days.

(21) Appl. No.: 14/402,757

(22) PCT Filed: Apr. 30, 2013

(86) PCT No.: PCT/JP2013/062613
§ 371 (c)(1),
(2) Date: Nov. 21, 2014

(87) PCT Pub. No.: WO2013/175949
PCT Pub. Date: Nov. 28, 2013

(65) Prior Publication Data
US 2015/0147630 A1    May 28, 2015

(30) Foreign Application Priority Data

May 22, 2012    (JP) .................................. 2012-116775

(51) Int. Cl.
*H01M 10/0567*     (2010.01)
*H01M 4/13*        (2010.01)
(Continued)

(52) U.S. Cl.
CPC ......... *H01M 10/0567* (2013.01); *H01M 4/13* (2013.01); *H01M 4/139* (2013.01);
(Continued)

(58) Field of Classification Search
None
See application file for complete search history.

(56) References Cited

U.S. PATENT DOCUMENTS 5,643,695 A * 7/1997 Barker ................ H01M 4/133
429/217
2005/0191553 A1   9/2005 Fujihara et al.
(Continued)

FOREIGN PATENT DOCUMENTS

| CN | 101483256 A | 7/2009 |
|---|---|---|
| JP | 2006/196250 A | 7/2006 |
| JP | 2007-250288 | 9/2007 |

*Primary Examiner* — Miriam Stagg
*Assistant Examiner* — Victoria H Lynch
(74) *Attorney, Agent, or Firm* — Finnegan, Henderson, Farabow, Garrett & Dunner, LLP

(57) ABSTRACT

Provided is a nonaqueous electrolyte secondary battery in which the following are housed in a battery case: a nonaqueous electrolyte, a boron atom-containing oxalato complex compound, and an electrode assembly in which a positive electrode having a positive electrode active material and a negative electrode having a negative electrode active material are disposed facing each other. Here, a coat containing boron atoms originating from the oxalato complex compound is formed on the surface of the negative electrode active material, and the amount $B_M$ ($\mu g/cm^2$) of the boron atom as measured based on inductively coupled plasma-atomic emission spectroscopic analysis and the intensity $B_A$ for a tricoordinate boron atom as measured based on x-ray absorption fine structure analysis satisfy $0.5 \leq B_A/B_M \leq 1.0$.

8 Claims, 5 Drawing Sheets

(51) Int. Cl.
*H01M 4/139* (2010.01)
*H01M 4/62* (2006.01)
*H01M 10/052* (2010.01)
H01M 4/36 (2006.01)
H01M 10/44 (2006.01)

(52) U.S. Cl.
CPC ......... *H01M 4/628* (2013.01); *H01M 10/052* (2013.01); *H01M 4/366* (2013.01); *H01M 10/446* (2013.01); *Y02T 10/7011* (2013.01); *Y10T 29/49115* (2015.01)

(56) References Cited

U.S. PATENT DOCUMENTS

| | | | |
|---|---|---|---|
| 2005/0233222 A1* | 10/2005 | Yanagida | H01M 10/0525 429/324 |
| 2006/0236528 A1* | 10/2006 | Xu | H01M 10/0525 429/324 |
| 2007/0166617 A1* | 7/2007 | Gozdz | H01M 4/133 429/231.95 |
| 2009/0181308 A1 | 7/2009 | Chiga et al. | |

* cited by examiner

NONAQUEOUS ELECTROLYTE SECONDARY BATTERY

CROSS REFERENCE TO RELATED PATENT APPLICATIONS

This application is a national phase of International Application No.PCT/JP2013/062613, filed on Apr. 30, 2013, which claims priority to Japanese Patent Application No. 2012-116775 filed may 22, 2016. These applications are incorporated herein by reference in their entirety.

TECHNICAL FIELD

The present invention relates to a secondary battery that is provided with a nonaqueous electrolyte (a nonaqueous electrolyte secondary battery). The present invention particularly relates to such a battery that contains an oxalato complex compound.

BACKGROUND ART

Lithium secondary batteries and other nonaqueous electrolyte secondary batteries are smaller and lighter and have a higher energy density and output density than conventional batteries and as a result are preferentially used as power sources for consumer electronic devices and as vehicle drive power sources. These types of batteries are typically fabricated by housing a nonaqueous electrolyte and an electrode assembly provided with a positive electrode and a negative electrode in a battery case. In addition, the battery (the assembled article) after fabrication is subjected to a charging process under prescribed conditions to adjust it to an actually usable state.

During this charging process, a portion of the nonaqueous electrolyte is reductively degraded at the negative electrode to form, on the surface of the negative electrode active material, a coat that originates from the nonaqueous electrolyte. This coat can then inhibit the reductive degradation of the nonaqueous electrolyte during subsequent charge-discharge cycles. Methods are also known in which an additive (typically a compound that, through degradation at or below the degradation potential of the nonaqueous electrolyte, can form a coat on the surface of the negative electrode active material) is added to the battery in advance in order to make this coat more stable. For example, a nonaqueous electrolyte secondary battery that contains an (oxalato)borate-type compound (e.g., lithium bis(oxalato) borate) is disclosed in Patent Literature 1.

CITATION LIST

Patent Literature

Patent Literature 1: Japanese Patent Application Laid-open No. 2007-250288

SUMMARY OF INVENTION

In a battery that contains an (oxalato)borate-type compound, this compound, which has a low degradation potential, undergoes degradation first during the charging process and forms a very stable coat on the surface of the negative electrode active material. As a consequence, the degradation reactions of, for example, the nonaqueous electrolyte, during subsequent charge-discharge cycles are even more effectively inhibited and the initial characteristics of the battery and its durability (for example, the high-temperature storage characteristics and the charge-discharge cycling characteristics) can be improved as a result. However, in contrast to the preceding, the resistance increases accompanying charge-discharge (insertion and extraction of the charge carrier) due to the fact that the surface of the negative electrode active material is coated by this coat, creating the risk of a decline in other battery performance features (for example, the input/output characteristics and particularly the output characteristics in low-temperature environments).

The present invention was realized in view of these circumstances and has as an object the introduction of a nonaqueous electrolyte secondary battery in which the effects of the aforementioned additive are favorably manifested and which thus has a high battery performance over a broad range of temperature environments (for example, the durability and the output characteristics can co-exist at high levels for both).

The present inventors thought that the internal resistance of the battery could be lowered by controlling the coat formed at the negative electrode active material surface to a favorable state and that this could solve the problem identified above. As a result of various investigations, they therefore discovered that a nonaqueous electrolyte secondary battery having even better properties is obtained by adjusting the skew, in the thickness direction, of the coat originating from the (oxalato)borate-type compound (specifically, the amount of the coat that is present at the outermost surface of the negative electrode active material with reference to the total amount of the coat formed on the surface of the negative electrode active material). The present invention was achieved based on this discovery.

The present invention provides a nonaqueous electrolyte secondary battery in which a battery case houses a nonaqueous electrolyte, a boron (B) atom-containing oxalato complex compound (referred to below as the "B-oxalato compound"), and an electrode assembly in which a positive electrode having a positive electrode active material and a negative electrode having a negative electrode active material are disposed facing each other. A coat containing boron (B) atoms originating from the B-oxalato compound is formed on the surface of the negative electrode active material. In addition, the ratio on the surface of the negative electrode active material between the intensity $B_A$ for the tricoordinate boron (B) atom and the amount $B_M$ ($\mu g/cm^2$) of the boron atom is $0.5 \leq B_A/B_M \leq 1.0$. This "amount $B_M$ of the boron atom" is the value measured based on inductively coupled plasma-atomic emission spectroscopy (ICP-AES). The "intensity $B_A$ for the tricoordinate boron atom" is the value measured based on x-ray absorption fine structure (XAFS) analysis.

A coat containing boron (B) atoms that originate from the B-oxalato compound is formed at the negative electrode active material surface in a battery with the above-described structure. Through the action of this coat, the interface between the negative electrode active material surface and nonaqueous electrolyte can be stabilized and degradation of, for example, the nonaqueous electrolyte, in subsequent charge-discharge cycles can then be favorably inhibited. Due to this, the battery can exhibit an excellent durability even in those instances in which, for example, it is exposed long-term to a high-temperature environment (typically about 50° C. to 80° C.). In addition, the resistance originating with this coat is reduced in a battery in which the ratio ($B_A/B_M$) for the boron atoms originating with the B-oxalato compound is in the range given above. As a consequence, the charge carrier movement associated with charge-discharge can proceed more smoothly than heretofore. For example, excellent output characteristics can be exhibited even in a low-temperature (typically at or below 0° C., for example, from about 0° C. to −50° C.) environment. Accordingly, both the durability (particularly the high-temperature storage characteristics) and the output characteristics (particularly the low-temperature output characteristics) can co-exist at high levels over a broad range of temperature environments in the herein disclosed nonaqueous electrolyte secondary battery.

In a preferred aspect, the amount of addition of the B-oxalato compound is at least 3 μmol/g and not more than 200 μmol/g with reference to the negative electrode active material. The coat can be formed in a desirable amount on the negative electrode active material as a whole when this amount of addition is satisfied, and as a consequence a battery can be realized that exhibits an even higher level of durability. In addition, the internal resistance can be lowered by keeping the amount of B-oxalato compound addition relatively low, and as a consequence a battery can be realized that exhibits even better output characteristics. Accordingly, the effects due to the addition of the B-oxalato compound are favorably realized with the battery according to this aspect and the effects from the application of the present invention can be exhibited at an even higher level.

The B-oxalato compound is the lithium bis(oxalato)borate with the following formula (I) (also referred to as "LiBOB" in the following) in a preferred aspect. A very stable coat can be formed at the negative electrode active material surface by using LiBOB. The degradation reactions of the nonaqueous electrolyte in subsequent charge-discharge cycles can be favorably inhibited as a consequence and the effects from the application of the present invention can then be exhibited at even higher levels.

[C1]

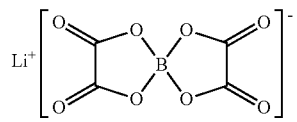

(I)

In a preferred aspect, the negative electrode active material is a particulate and the specific surface area of this particulate negative electrode active material based on a BET method is at least 1 m²/g and not more than 10 m²/g. A fine and dense negative electrode mixture layer having a high conductivity and an excellent energy density can be produced when the negative electrode active material has a specific surface area in the indicated range. Moreover, impregnation with the electrolyte (and B-oxalato compound) can be facilitated because void spaces can be retained to a suitable degree within the negative electrode mixture layer. The effects of the present invention can therefore be favorably exhibited and the durability and output characteristics can then co-exist at an even higher levels.

A method of producing a nonaqueous electrolyte secondary battery is also disclosed in accordance with the present invention. This production method includes fabricating a battery by housing, in a battery case, a nonaqueous electrolyte, a B-oxalato compound, and an electrode assembly in which a positive electrode having a positive electrode active material and a negative electrode having a negative electrode active material are disposed facing each other; and forming a coat containing boron (B) atoms originating from this B-oxalato compound on the surface of the negative electrode active material by carrying out a charging process such that the voltage between the positive electrode and the negative electrode reaches a prescribed value. The charging rate in this charging process is set at least 1.5 C and not more than 5 C.

The B-oxalato compound is able to undergo a favorable degradation by having the charging rate be not more than 5 C, and a fine, dense, and strong coat can then be formed on the surface of the negative electrode active material. A coat with a resistance lower than heretofore can be formed by having the charging rate be at least 1.5 C. The boron atom ratio ($B_A/B_M$) can as a consequence be adjusted to a favorable value using this production method and a battery having an excellent durability and output characteristics can then be produced. Moreover, the herein disclosed production method makes it possible to form a favorable coat on the negative electrode active material using only a relatively simple process, i.e., the charging process. This is also preferable from the standpoints of the productivity and the manufacturing efficiency. Here, 1 C denotes the current value capable of charging to the battery capacity (Ah) predicted from the theoretical capacity in 1 hour. For example, 1 C=24 A when the battery capacity is 24 Ah.

In a preferred aspect, this charging process includes a first charging process of charging for a prescribed amount of time at a prescribed charging rate set within the charging rate range; and a second charging process of charging for a prescribed amount of time at a charging rate that is higher than that in the first charging process. By using two stages for the charging process, preferred values can be established for both the conditions for forming the coat that will be formed in the region proximal to the negative electrode active material and the conditions for forming the coat that will be formed in the region (the outermost surface region) separated from the negative electrode active material. Thus, setting the charging rate to a lower rate in the first charging process makes it possible to form a fine and dense (high density) coat at the negative electrode active material surface. High battery characteristics can as a consequence be maintained even after long-term exposure to a severe environment (for example, a high-temperature environment). In addition, a coat with a relatively low density (sparse) can be formed by establishing a higher value for the charging rate in the second charging process. Due to this, charge carrier movement in association with charge-discharge is made smoother than heretofore and, for example, high output characteristics can be exhibited even in a low-temperature environment. Thus, the effects of the present invention can be exhibited at even higher levels by using the ranges indicated above for the charging rates.

In a preferred aspect, the charging rate in the second charging process is set at a value that is at least 1.5-times and not more than 3-times the charging rate in the first charging process. A battery with excellent output characteristics in which the resistance is lowered even further can be produced when the difference between the charging rates is in the indicated range. The effects from the application of the present invention can as a result be exhibited at an even higher level.

In a preferred aspect, the amount of addition of the B-oxalato compound is set at least 3 μmol/g and not more than 200 μmol/g with reference to the negative electrode active material. By using the indicated range for the amount of B-oxalato compound addition, the coat can be reliably and securely formed at the negative electrode (negative electrode active material) and a high durability can be provided. In addition, the internal resistance attributable to this coat can be reduced and a battery with excellent output characteristics can then be realized. This production method thus makes it possible to realize the effects from the application of the present invention at an even higher level.

At least lithium bis(oxalato)borate is used as the B-oxalato compound in a preferred aspect. An even stronger and very stable coat can be formed at the negative electrode active material surface through the use of LiBOB. The degradation reactions of the nonaqueous electrolyte that are associated with subsequent charge-discharge cycles can then be even more favorably inhibited, thereby enabling the production of a battery with an even higher performance.

A particulate negative electrode active material having a specific surface area based on a BET method of at least 1 $m^2/g$ and not more than 10 $m^2/g$ is used as the negative electrode active material in a preferred aspect. A negative electrode mixture layer with a high energy density can be produced by using a negative electrode active material that has a specific surface area in the indicated range. In addition, void spaces can be retained to a suitable degree within the negative electrode mixture layer and as a consequence impregnation with the nonaqueous electrolyte is facilitated and a negative electrode mixture layer with a reduced resistance can then be produced. Thus, even better battery characteristics can be realized in accordance with this production method.

The present invention also provides a battery pack including a combination of a plurality of the herein disclosed nonaqueous electrolyte secondary batteries (cells). In a battery pack in which a plurality of cells are connected to each other (typically in series), the performance of the whole can be dependent on the cell with the lowest performance among the constituent cells. The herein disclosed nonaqueous electrolyte secondary battery, because it can exhibit a durability and output characteristics that are relatively higher than conventional batteries, can realize a higher level of battery performance when in a battery pack configuration.

The present invention further provides a vehicle equipped with this battery pack as a drive power source. The herein disclosed battery can be used for a variety of applications, but it is characterized by a lower battery resistance than heretofore: for example, it is characterized by excellent high-temperature storage characteristics and by excellent output characteristics in a low-temperature environment. It is thus well adapted for use in applications where a high durability and high output characteristics are required over a broad range of temperature environments, for example, as a power source for the drive motor in a vehicle (drive power source).

DESCRIPTION OF EMBODIMENTS

Figure 1:
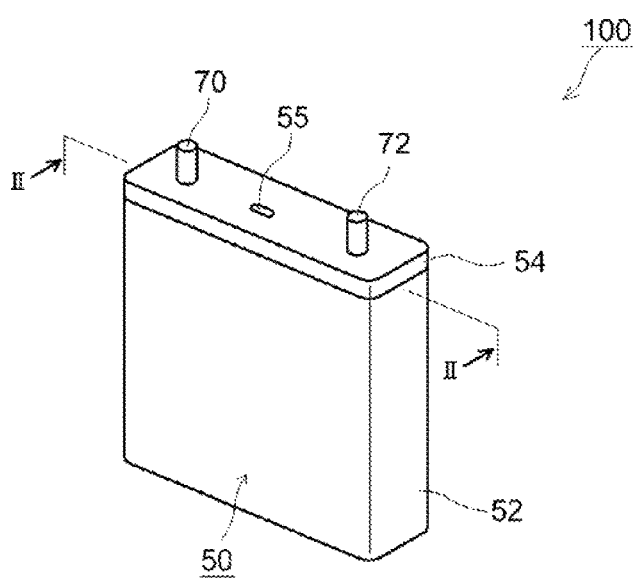
FIG. 1 is a perspective diagram that schematically shows the outer shape of a nonaqueous electrolyte secondary battery according to an embodiment of the present invention.

Preferred embodiments of the herein disclosed nonaqueous electrolyte secondary battery are described in the following. Matters required for execution but not particularly described in this Description can be understood as design matters for the individual skilled in the art based on the conventional art in the pertinent field. The nonaqueous electrolyte secondary battery with the instant structure can be implemented based on the contents disclosed in this Description and the common general technical knowledge in the pertinent field. The herein disclosed nonaqueous electrolyte secondary battery may be more particularly described in the following using the lithium secondary battery as a typical example, but this should not be construed as limiting the applications of the present invention to such a battery.

In this Description, a "nonaqueous electrolyte secondary battery" refers to a battery that is provided with a nonaqueous electrolyte (typically an electrolyte solution that contains a supporting salt in a nonaqueous solvent), with the lithium secondary battery being a typical example. A "lithium secondary battery" refers to a secondary battery that uses the lithium ion as a charge carrier and that realizes charge-discharge by the movement of lithium ions between the positive and negative electrodes. The secondary batteries generally known as lithium ion batteries, lithium polymer batteries, lithium ion capacitors, and so forth, are typical examples encompassed by the lithium secondary battery in this Description. The "active material" in this Description refers to a substance (compound), on the positive electrode side or negative electrode side, that is capable of the reversible insertion and extraction of the chemical species that acts as the charge carrier (the lithium ion in lithium secondary batteries).

The herein disclosed nonaqueous electrolyte secondary battery has a structure in which a battery case houses therewithin a nonaqueous electrolyte, the B-oxalato compound, and an electrode assembly having a positive electrode and a negative electrode disposed facing each other. The negative electrode here is provided with a negative electrode active material, and a coat containing boron (B) originating from the B-oxalato compound is formed on the surface of this negative electrode active material. In addition, the ratio at the negative electrode active material surface between the amount of boron $B_M$ ($\mu g/cm^2$) and the intensity $B_A$ for the tricoordinate boron satisfies the following relationship: $0.5 \leq B_A/B_M \leq 1.0$ (preferably $0.6 \leq B_A/B_M \leq 0.8$). Degradation of, e.g., the nonaqueous electrolyte, can be favorably inhibited in the thusly structured battery by the boron atom-containing coat at the negative electrode active material surface, and as a result of this an excellent durability can be exhibited. In addition, by having the boron atom ratio ($B_A/B_M$) at the negative electrode active material surface be in the indicated range, the increase in resistance associated with coat formation can be kept low, and as a result of this excellent output characteristics can be exhibited.

The "intensity $B_A$ for the tricoordinate boron atom" can be measured by x-ray absorption fine structure analysis. The x-ray absorption fine structure (XAFS) analytical procedure will be briefly described here. When a substance is exposed to x-rays, generally a portion of the incident x-radiation is absorbed due to, inter alia, the excitation of inner shell electrons. Utilizing this, the ratio ($I/I_0$) between the x-ray intensity prior to incidence on the measurement target ($I_0$) and the x-ray intensity (I) after transmission through the measurement target, is measured and analyzed in XAFS. This can provide information on the local structure for the atom under scrutiny (for example, the valence and coordination number of this atom, the neighboring atomic species). In other words, even for the same species of atom, atoms which have, for example, different coordination numbers or different neighboring atoms can be distinguished and quantitated using this procedure. For example, B-K edge peaks originating with boron (B) atoms having a tricoordinate structure have peaks in the 193 eV to 194 eV energy region, while B-K edge peaks originating with boron (B) atoms having a tetracoordinate structure have peaks in the 197 eV to 199 eV energy region. This measurement is preferably carried out while incrementally changing the energy of the incident x-rays and, for example, is preferably carried out using the beam line (BL) of a synchrotron radiation facility capable of continuously changing the x-radiation.

When added to the battery (i.e., in the state prior to the charging process), the B-oxalato compound has a tetracoordinate structure in which, for example, oxalate ions are coordinated to a boron (B) central atom (refer to formula (I) above). However, when reductive degradation at the negative electrode is brought about by the charging process, the boron (B) atom assumes a tricoordinate structure and bonds (attaches) to the surface of the negative electrode active material to form a coat. Accordingly, the XAFS procedure can distinguish and quantitate only the boron (B) atoms that are forming the coat. In the present invention, the measurement is performed for tricoordinate boron atoms having a peak at energies of 193 eV to 194 eV (the B-K edge) and the "intensity $B_A$ for the tricoordinate boron atom" is taken to be the value yielded by subtracting the baseline value from the obtained peak intensity. The baseline is determined based on the spectral data in the 191 eV to 192 eV range. The depth of x-ray penetration in XAFS is several tens of nanometers, and therefore in this case the boron (B) in the coat present in the zone to a depth of several tens of nanometers from the surface most level of the negative electrode active material can be measured. The specific measurement instrumentation and measurement conditions are particularly described in the examples given below.

The "amount $B_M$ of the boron atom" can be measured by inductively coupled plasma-atomic emission spectroscopy. In inductively coupled plasma-atomic emission spectroscopy (referred to as "ICP-AES" hereafter), the boron atoms are first dissolved (eluted) by immersing the boron (B) atom-containing measurement sample (the negative electrode mixture layer) that is the measurement target in an acid solvent. The total amount of boron (B) atoms present on the negative electrode (negative electrode active material) is then measured by analyzing this solution. While a procedure using AES as the detector is given here, another analytical procedure (for example, mass spectrometry (MS)) can also be used. In the present invention, the value obtained by dividing the boron (B) atom content (µg) measured by ICP-AES by the area (cm²) of the measurement sample, i.e., the amount of the boron (B) atom per unit area (µg/cm²), is taken to be the "amount $B_M$ of the boron atom".

That is, $B_A/B_M$, which is a characteristic feature of the present invention, represents the degree to which the coat originating from the B-oxalato compound and formed on the negative electrode (on the negative electrode active material), is skewed to the outermost surface side (that is, the degree of skew in the boron (B) atom-containing coat).

The quantity of B-oxalato compound addition and the charging rate in the charging process are examples of factors that can exercise a major influence on the $B_A/B_M$ value. As a general matter, and keeping other conditions the same, the value of $B_M$ rises in proportion to increases in the amount of B-oxalato compound addition. In addition, as shown in the examples below, the value of $B_A$ is substantially influenced by the charging rate in the charging process (typically the first charging process).

The values of $B_A$ and $B_M$ are not particularly limited as long as the $B_A/B_M$ value indicated above is satisfied, but when, for example, the value of $B_M$ is too large, a high internal resistance occurs and the output characteristics may then deteriorate. When the value of $B_M$ is too low, the durability may then be unsatisfactory. Thus, $0.01 \leq B_M \leq 0.5$ (for example, $0.05 \leq B_M \leq 0.2$) is preferred. The value of $B_A$ can be $0.01 \leq B_A \leq 0.1$ (typically $0.01 < B_A < 0.1$ and, for example, $0.02 \leq B_A \leq 0.06$).

The herein disclosed battery can be produced, for example, by a method encompassing (1) fabricating a battery by housing, in a battery case, a nonaqueous electrolyte, a B-oxalato compound, and an electrode assembly in which a positive electrode having a positive electrode active material and a negative electrode having a negative electrode active material are disposed facing each other, and (2) forming, on the surface of the negative electrode active material, a coat containing boron (B) atoms that originate from the B-oxalato compound, by carrying out a charging process such that the voltage between the positive electrode and the negative electrode reaches a prescribed value. This method of battery production is described in sequence in the following.

The positive electrode of the herein disclosed nonaqueous electrolyte secondary battery is provided with a positive electrode current collector and with a positive electrode mixture layer that contains at least a positive electrode active material and is formed on the positive electrode current collector. Such a positive electrode can be fabricated, for example, by mixing, inter alia, a positive electrode active material, an electroconductive material, and a binder in a solvent to produce a slurry-form (this encompasses pastes and inks, which also applies hereafter) composition (referred to below as the "positive electrode mixture slurry") and applying this positive electrode mixture slurry onto the positive electrode current collector to form a positive electrode mixture layer (also referred to as the positive electrode active material layer).

Various heretofore known stirring-mixing devices, for example, ball mills, mixers, dispersers, kneaders, and so forth, can be used as appropriate to prepare the positive electrode mixture slurry. The solids fraction concentration (NV) in the slurry is not particularly limited and can be, for example, 50% by mass to 75% by mass (preferably 55% by mass to 65% by mass and more preferably 55% by mass to 60% by mass). The positive electrode mixture layer can be formed by applying the positive electrode mixture slurry on the positive electrode current collector using a heretofore known coating apparatus, for example, a slit coater, die coater, comma coater, gravure coater, dip coater, and so forth. The mass of the positive electrode mixture layer (total mass for both sides for a structure that has a positive electrode mixture layer on both sides of the positive electrode current collector) disposed per unit area of the positive electrode current collector can be, for example, about 10 mg/cm$^2$ to 30 mg/cm$^2$. After the application of the positive electrode mixture slurry in this production method, the solvent present in the positive electrode mixture slurry is removed by a suitable drying procedure. Drying by, for example, natural drying, a hot wind, a low-humidity wind, a vacuum, infrared radiation, far infrared radiation, electron beam, and so forth, either individually or in a combination, can be used for this procedure.

The amount of the positive electrode active material in the positive electrode mixture layer as a whole is not particularly limited, and can be at least 50% by mass (typically at least 70% by mass to less than 100% by mass, for example, at least 80% by mass and not more than 99% by mass). The amount of the electroconductive material in the positive electrode mixture layer as a whole is not particularly limited, and can be, for example, at least 0.1% by mass and not more than 15% by mass (typically at least 1% by mass and not more than 10% by mass, for example, at least 2% by mass and not more than 7% by mass). The amount of the binder in the positive electrode mixture layer as a whole is not particularly limited, and can be, for example, at least 0.1% by mass and not more than 10% by mass (preferably at least 1% by mass and not more than 7% by mass).

The thickness and density of the positive electrode mixture layer can be adjusted by carrying out a suitable pressing treatment on the positive electrode on which the mixture layer has been formed proceeding as described above. This pressing treatment can use the various heretofore known pressing methods, for example, roll pressing methods, platen pressing methods, and so forth. The thickness of the positive electrode mixture layer after the pressing treatment can be, for example, at least 20 μm (typically at least 50 μm) and not more than 200 μm (typically not more than 100 μm). The density of the positive electrode mixture layer is also not particularly limited, and can be, for example, at least 1.5 g/cm$^3$ (typically at least 2.0 g/cm$^3$) and not more than 4.5 g/cm$^3$ (typically not more than 4.2 g/cm$^3$). A positive electrode mixture layer that satisfies these ranges can realize a high battery performance (for example, a high energy density and output density) and is therefore preferred.

An electroconductive member of a metal with an excellent electroconductivity (for example, aluminum, nickel, titanium, stainless steel, and so forth) is preferably used for the positive electrode current collector. The shape of the current collector will vary in conformity with, for example, the shape of the battery and thus is not particularly limited. For example, a rod-shaped article, a plate-shaped article, a foil-shaped article, a mesh- or network-shaped article, and so forth, can be used. A foil-shaped article is mainly used in the case of a battery that is provided with a wound electrode assembly, vide infra. The thickness of such a current collector foil is not particularly limited, but is preferably about 5 μm to 50 μm (more preferably 8 μm to 30 μm) in order to obtain a good balance between the strength of the current collector and the capacity density of the battery.

One or two or more of the substances heretofore used in nonaqueous electrolyte secondary batteries can be used without particular limitation as the positive electrode active material. Examples are as follows: oxides that contain the element lithium and at least one transition metal element (preferably at least one of nickel, cobalt, and manganese) as structural metal elements (lithium transition metal oxides), e.g., lithium nickel oxides (for example, LiNiO$_2$), lithium cobalt oxides (for example, LiCoO$_2$), and lithium manganese oxides (for example, LiMn$_2$O$_4$), and phosphates that contain the element lithium and a transition metal element as structural metal elements, e.g., lithium manganese phosphate (LiMnPO$_4$) and lithium iron phosphate (LiFePO$_4$). Among the preceding, the use is preferred—because this provides an excellent thermal stability and also a high energy density—of a positive electrode active material in which the major component is a layer-structured lithium nickel cobalt manganese complex oxide containing the element lithium, the element nickel, the element cobalt, and the element manganese as structural elements (for example, LiNi$_{1/3}$Co$_{1/3}$Mn$_{1/3}$O$_2$) (the positive electrode active material typically formed of substantially a lithium nickel cobalt manganese complex oxide). For example, lithium transition metal oxides of this type (typically a particulate) produced by heretofore known methods can be used as such.

In addition to oxides having lithium (Li), nickel (Ni), cobalt (Co), and manganese (Mn) as structural metal elements, the lithium nickel cobalt manganese complex oxides here also encompass oxides that contain at least one metal element in addition to the Li, Ni, Co, and Mn (a transition metal element and/or a main group element other than Li, Ni, Co, and Mn). This metal element can be one or two or more elements from, for example, magnesium (Mg), calcium (Ca), strontium (Sr), titanium (Ti), zirconium (Zr), vanadium (V), niobium (Nb), chromium (Cr), molybdenum (Mo), tungsten (W), iron (Fe), rhodium (Rh), palladium (Pd), platinum (Pt), copper (Cu), zinc (Zn), boron (B), aluminum (Al), gallium (Ga), indium (In), tin (Sn), lanthanum (La), and cerium (Ce). The same also applies to the lithium nickel oxides, lithium cobalt oxides, and lithium manganese oxides. The amount of this substitutional structural element is not particularly limited, and can be exemplified—expressed with reference to 100% by mass for the total of the substitutional element, Ni, Co, and Mn—of at least 0.05% by mass (typically at least 0.1% by mass, for example, at least 0.2% by mass) and not more than 5% by mass (typically not more than 3% by mass, for example, not more than 2.5% by mass).

Also usable are, for example, so-called solid solution-type lithium-excess transition metal oxides, such as represented by the general formula: $x\text{Li}[\text{Li}_{1/3}\text{Mn}_{2/3}]\text{O}_2 \cdot (1-x)\text{LiMeO}_2$ (in this formula, Me is a single transition metal species or two or more species of transition metals and x satisfies $0 < x \le 1$).

One or two or more of the materials heretofore used in nonaqueous electrolyte secondary batteries can be used without particular limitation as the electroconductive material. Examples in this regard are one or two or more selections from carbon materials such as carbon blacks (for example, acetylene black, furnace black, Ketjen black, channel black, lamp black, and thermal black), coke, active carbon, graphite (natural graphite and its modifications, synthetic graphite), carbon-based fibers (PAN-based carbon fibers, pitch-based carbon fibers), carbon nanotubes, fullerenes, and graphene. Or, metal fibers (for example, aluminum fibers, stainless steel (SUS) fibers, and so forth), conductive metal powders (for example, metal powders of Ag, Ni, Cu, and so forth), metal oxides (for example, ZnO, SnO$_2$, and so forth), and synthetic fibers whose surface is coated with a metal may also be used. Among the preceding, the use is preferred of a carbon black (typically an acetylene black), which has a relatively small particle diameter and a large specific surface area.

One or two or more of the materials heretofore used in nonaqueous electrolyte secondary batteries can be used without particular limitation as the binder. For example, when the positive electrode mixture layer is formed using an organic solvent-based slurry (a solvent-based slurry in which the major component of the dispersion medium is an organic solvent), the use of a polymer that disperses or dissolves in organic solvents is preferred. Such polymers can be exemplified by polyvinylidene fluoride (PVdF), polyvinylidene chloride (PVdC), and polyethylene oxide. Or, when the positive electrode mixture layer is formed using an aqueous slurry, the use of a polymer that dissolves or disperses in water is preferred. Polymers that dissolve in water (water-soluble polymers) can be exemplified by cellulosic polymers such as carboxymethyl cellulose (CMC), methyl cellulose (MC), cellulose acetate butyrate (CAP), and hydroxypropyl methyl cellulose (HPMC); polyvinyl alcohol (PVA); acrylic polymers such as polymethyl methacrylate (PMMA); and urethane polymers such as polyurethane. Polymers that disperse in water (water-dispersible polymers) can be exemplified by vinylic polymers such as polyethylene (PE) and polypropylene (PP); ethylenic polymers such as polyethylene oxide (PEO) and polytetrafluoroethylene (PTFE); fluororesins such as tetrafluoroethylene-hexafluoropropylene copolymer (FEP) and tetrafluoroethylene-perfluoroalkyl vinyl ether copolymer (PFA); vinyl acetate copolymers; and rubbers such as styrene-butadiene rubber (SBR) and acrylic acid-modified SBR resin (SBR latex).

Any solvent that can uniformly disperse or dissolve the materials used to form the slurry under consideration can be used as the solvent without particular limitation. For example, one or two or more of the solvents heretofore used to produce nonaqueous electrolyte secondary batteries can be used. These solvents can be generally divided into organic solvents and aqueous solvents. The organic solvents can be exemplified by amide-type solvents, alcohol-type solvents, ketone-type solvents, ester-type solvents, amine-type solvents, ether-type solvents, nitrile-type solvents, cyclic ether-type solvents, and aromatic hydrocarbon solvents. Specific examples are N-methyl-2-pyrrolidone (NMP), N,N-dimethylformamide. N,N-dimethylacetamide, 2-propanol, ethanol, methanol, acetone, methyl ethyl ketone, methyl propenoate, cyclohexanone, methyl acetate, ethyl acetate, methyl acrylate, diethyltriamine, N,N-dimethylaminopropylamine, acetonitrile, ethylene oxide, tetrahydrofuran, dioxane, benzene, toluene, ethylbenzene, xylene, dimethyl sulfoxide, dichloromethane, trichloromethane, and dichloroethane, wherein typically NMP can be used. In addition, the aqueous solvent is preferably water or a mixed solvent in which the major component is water. The solvent other than water in such a mixed solvent can be a suitable selection of one or two or more organic solvents that can be uniformly mixed with water (e.g., lower alcohols, lower ketones). For example, the use is preferred of an aqueous solvent in which water is at least 80% by mass (more preferably at least 90% by mass and even more preferably at least 95% by mass) of the aqueous solvent. A particularly preferred example is an aqueous solvent that is substantially water (for example, water).

Insofar as the effects of the present invention are not significantly impaired, various additives (for example, an inorganic compound that generates gas during an overcharging event, a material capable of functioning as a dispersing agent) may also be added to the positive electrode mixture slurry being produced here. Compounds that can generate gas during an overcharging event can be exemplified by carbonate salts (for example, lithium carbonate) and oxalate salts (for example, lithium oxalate). The dispersing agent can be exemplified by polymeric compounds that have a hydrophobic chain and a hydrophilic group (for example, alkali salts and typically sodium salts), anionic compounds that have, for example, a sulfate salt, a sulfonate salt, or a phosphate salt; and cationic compounds such as amines. In specific terms the following may be used: carboxymethyl cellulose (CMC), methyl cellulose, ethyl cellulose, hydroxypropyl cellulose, butyral, polyvinyl alcohol, modified polyvinyl alcohols, polyethylene oxide, polyvinylpyrrolidone, polycarboxylic acids, oxidized starch, and starch phosphate.

The negative electrode of the herein disclosed nonaqueous electrolyte secondary battery is provided with a negative electrode current collector and with a negative electrode mixture layer that contains at least a negative electrode active material and is formed on the negative electrode current collector. Such a negative electrode can be fabricated, for example, by mixing, inter alia, a negative electrode active material and a binder in a suitable solvent to produce a slurry-form composition (referred to below as the "negative electrode mixture slurry") and applying this negative electrode mixture slurry onto the negative electrode current collector to form a negative electrode mixture layer (also referred to as the negative electrode active material layer). The negative electrode mixture slurry can be prepared using the same procedures as described above for the positive electrode. The solids fraction concentration (NV) in the slurry is not particularly limited and can be, for example, 40%, by mass to 65% by mass (preferably 45% by mass to 55% by mass and more preferably 45% by mass to 50% by mass). Formation of the negative electrode mixture layer and drying may also be carried out using the same procedures as described above for the positive electrode. The mass of the negative electrode mixture layer (total mass for both sides) disposed per unit area of the negative electrode current collector can be, for example, about 5 mg/cm$^2$ to 30 mg/cm$^2$.

The amount of the negative electrode active material in the negative electrode mixture layer as a whole is not particularly limited, but generally at least about 50% by mass is suitable, for example, this amount can be at least 90% by mass and not more than 99% by mass (for example, at least 95% by mass and not more than 99% by mass). The amount of the binder in the negative electrode mixture layer as a whole is not particularly limited, and can be, for example, at least 1% by mass and not more than 10% by mass (preferably at least 2% by mass and not more than 5% by mass). Besides the preceding, the same additives as described for the positive electrode (for example, carboxymethyl cellulose (CMC) as a dispersing agent), an electroconductive material, and so forth, may be used as appropriate.

The thickness and density of the negative electrode mixture layer can be adjusted by carrying out a suitable pressing treatment on the negative electrode on which the mixture layer has been formed proceeding as described above. The thickness of the negative electrode mixture layer after the pressing treatment can be, for example, at least 20 μm (typically at least 50 μm) and not more than 200 μm (typically not more than 100 μm). The density of the negative electrode mixture layer is also not particularly limited, and can be, for example, at least 0.8 g/cm$^3$ (typically at least 1.0 g/cm$^3$) and not more than 1.6 g/cm$^3$ (typically not more than 1.5 g/cm$^3$, for example, not more than 1.4 g/cm$^3$).

An electroconductive member of a metal with an excellent electroconductivity (for example, copper, nickel, titanium, stainless steel, and so forth) is preferably used as the negative electrode current collector. In addition, the shapes used for the negative electrode current collector can be, for example, the same as the shapes indicated for the positive electrode current collector.

One or two or more of those materials heretofore used in nonaqueous electrolyte secondary batteries can be used without particular limitation as the negative electrode active material. Examples here are carbon materials such as, for example, natural graphite, artificial graphites produced from petroleum- or coal-based materials, and their modifications, hard carbon (hard-to-graphitize carbon), soft carbon (easy-to-graphitize carbon), and carbon nanotubes; metal oxides such as lithium titanium complex oxides and iron oxides; and metals such as tin (Sn), silicon (Si), aluminum (Al), zinc (Zn), lithium (Li), and so forth, as well as metals constituted of metal alloys in which these metal elements are the major component. Among the preceding, the use is preferred of graphitic materials (graphite) because a high energy density can then be obtained.

The negative electrode active material used here is typically a particulate. There are no particular limitations on the properties of the negative electrode active material particulate. Its particle diameter can be, for example, at least 1 μm and not more than 30 μm (typically at least 5 μm and not more than 20 μm). In addition, the specific surface area of the negative electrode active material particulate can be, for example, at least $0.1$ $m^2/g$ (typically at least 1 $m^2/g$ and preferably at least 2 $m^2/g$) and not more than 20 $m^2/g$ (typically not more than 10 $m^2/g$ and preferably not more than 5 $m^2/g$). A fine and dense, highly electroconductive negative electrode mixture layer with an excellent energy density can be realized when the negative electrode active material particulate satisfies the indicated ranges for the particle diameter and/or the specific surface area. Moreover, the capacity for impregnation with the electrolyte (and the B-oxalato compound) can be raised even further because void spaces can be retained to a suitable degree within the negative electrode mixture layer. The effects of the present invention can therefore be more favorably exhibited and an even higher battery performance (for example, the output characteristics) can be realized.

The "particle diameter" referenced in this Description denotes the particle diameter that corresponds to a cumulative of 50% (the $D_{50}$ particle diameter, also referred to as the median diameter) from the fines side in the volume-based particle diameter distribution measured by a particle diameter distribution measurement based on the usual laser diffraction light scattering method. In this Description the "specific surface area" denotes the value measured by a specific surface area measurement method based on a BET method (for example, a single-point BET method).

For example, the polymers provided above as examples of binders for use with the positive electrode mixture layer can be used as appropriate as the binder. Specific examples are styrene-butadiene rubber (SBR), polyvinylidene fluoride (PVdF), and polytetrafluoroethylene (PTFE).

Figure 3:
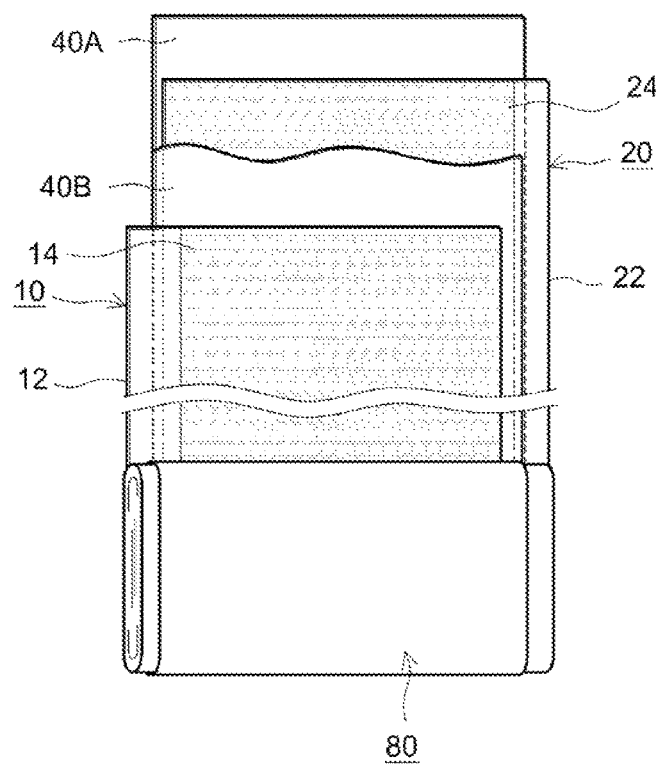
FIG. 3 is a schematic diagram that shows the structure of a wound electrode assembly according to an embodiment of the present invention.

An electrode assembly is then fabricated by stacking the thusly fabricated positive and negative electrodes. There are no particular limitations on the shape of this electrode assembly, but, for example, it may have a wound shape (a wound electrode assembly 80), as shown in FIG. 3, provided by stacking a long strip-shaped positive electrode 10 and a long strip-shaped negative electrode 20 and winding.

A separator is interposed between the positive electrode and the negative electrode in a typical structure for the herein disclosed nonaqueous electrolyte secondary battery. The same various porous sheets as heretofore used in nonaqueous electrolyte secondary batteries can be used as this separator. Specific examples are porous resin sheets (coats, nonwoven fabrics, and so forth) of a resin such as polyethylene (PE), polypropylene (PP), a polyester, cellulose, a polyamide, and so forth. This porous resin sheet may have a single-layer structure or may have a multiple structure of two or more layers (for example, a three-layer structure in which a PP layer is laminated on both sides of a PE layer). The nonaqueous electrolyte, supra, may be constructed to double as the separator in a secondary battery that uses a solid nonaqueous electrolyte (a lithium polymer battery).

The nonaqueous electrolyte secondary battery (i.e., the assembled battery prior to charging) can be fabricated by housing, in a battery case, the nonaqueous electrolyte, the B-oxalato compound, and the wound electrode assembly in which the positive electrode and negative electrode are disposed facing each other (typically with the separator interposed therebetween).

The materials and shapes heretofore used for the battery cases of nonaqueous electrolyte secondary batteries can be used for the battery case. The material can be exemplified by metals such as aluminum, steel, and so forth, and by resins such as polyphenylene sulfide resins and polyimide resins. Among the preceding, the use is preferred of a relatively lightweight metal (for example, aluminum or an aluminum alloy) with the goal of improving the heat dissipation and raising the energy density. The shape of the battery case (the outer shape of the container) can be exemplified by circular (cylindrical, coin-shaped, button-shaped), hexahedral (rectangular parallelepiped, cubic), bag-shaped, and shapes provided by processing and deforming the preceding. In addition, a safety mechanism, for example, a current-interrupt mechanism (a mechanism that can interrupt the current in response to a rise in the internal pressure during overcharging of the battery) may also be disposed in the battery case.

A supporting salt (a lithium salt for a lithium secondary battery) incorporated in a suitable nonaqueous solvent is typically used as the nonaqueous electrolyte. A nonaqueous electrolyte may also be used as provided by adding a polymer to a liquid nonaqueous electrolyte to convert it into a solid (typically a so-called gel).

One or two or more of the nonaqueous solvents heretofore used in nonaqueous electrolyte secondary batteries can be used without particular limitation as the nonaqueous solvent. Typical examples are aprotic solvents such as carbonates, esters, ethers, nitriles, sulfones, and lactones. Specific examples are ethylene carbonate (EC), propylene carbonate (PC), diethyl carbonate (DEC), dimethyl carbonate (DMC), ethyl methyl carbonate (EMC), 1,2-dimethoxyethane, 1,2-diethoxyethane, tetrahydrofuran, 2-methyltetrahydrofuran, dioxane, 1,3-dioxolane, diethylene glycol, dimethyl ether, ethylene glycol, acetonitrile, propionitrile, nitromethane, N,N-dimethylformamide, dimethyl sulfoxide, sulfolane, and γ-butyrolactone. Among the preceding, a nonaqueous solvent in which carbonate is the major component is degraded by the charging process and can form a good quality coat on the surface of the negative electrode active material, and its use is preferred as a consequence. Among the preceding, the use is more preferred of EC, which has a high dielectric constant, and DMC and EMC, which have a high standard oxidation potential (that is, a broad potential window). For example, the use is particularly preferred of a nonaqueous solvent that contains one or two or more carbonates as the nonaqueous solvent wherein the total volume of these carbonates accounts for at least 60% by volume of the total volume of the nonaqueous solvent (more preferably at least 75% by volume and even more preferably at least 90% by volume, and may be substantially 100% by volume).

An ion-containing compound known to be able to function as a charge carrier for a nonaqueous electrolyte secondary battery can be used as the supporting salt. For example, a lithium salt, sodium salt, magnesium salt, and so forth, can be used. Various lithium salts can be used in the case of a lithium secondary battery, e.g., $LiPF_6$, $LiBF_4$, $LiClO_4$, $LiN(SO_2CF_3)_2$, $LiN(SO_2C_2F_3)_2$, $LiCF_3SO_3$, $LiC_4F_9SO_3$, and $LiC(SO_2CF_3)_3$. The use of $LiPF_6$ is preferred among the preceding. While the concentration of the supporting salt is not particularly limited, when it is excessively low the amount of charge carrier (typically the lithium ion) in the electrolyte will then be deficient and the ionic conductivity will assume a declining trend. When this concentration is excessively high, the electrolyte will have a high viscosity in the temperature region at and below room temperature (for example, 0° C. to 30° C.) and the ionic conductivity will again assume a declining trend. As a consequence, the supporting salt concentration is preferably generally at least 0.1 mol/L and not more than 2 mol/L (for example, at least 0.8 mol/L and not more than 1.5 mol/L).

The B-oxalato compound has a structural moiety in which at least one oxalate ion ($C_2O_4^{2-}$) is coordinated to boron (B). Compounds represented by the following formulas (II) and (III) are typical examples. One or two or more of such compounds as produced by a known method or acquired by, for example, purchase of a commercial product, can be used without particular limitation.

[C2]

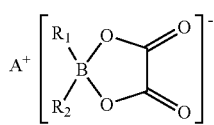

(II)

[C3]

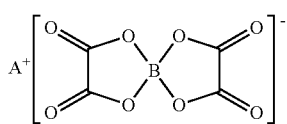

(III)

The $R_1$ and $R_2$ in formula (II) are each independently selected from halogen atoms (for example, F, Cl, and Br and preferably F) and perfluoroalkyl groups that have 1 to 10 (preferably 1 to 3) carbon atoms. The $A^+$ in formulas (II) and (III) may be an inorganic cation or an organic cation. The inorganic cation can be specifically exemplified by the cations of alkali metals such as Li, Na, and K; the cations of alkaline-earth metals such as Be, Mg, and Ca; the cations of other metals such as Ag, Zn, Cu, Co, Fe, Ni, Mn, Ti, Pb, Cr, V, Ru, Y, the lanthanoids, and the actinoids; and the proton. The organic cations can be specifically exemplified by tetraalkylammonium ions such as the tetrabutylammonium ion, tetraethylammonium ion, and tetramethylammonium ion; trialkylammonium ions such as the triethylmethylammonium ion and triethylammonium ion; and also by the pyridinium ion, imidazolium ion, tetraethylphosphonium ion, tetramethylphosphonium ion, tetraphenylphosphonium ion, triphenylsulfonium ion, and triethylsulfonium ion. Preferred cations can be exemplified by the lithium ion, tetraalkylammonium ions, and the proton.

A compound represented by formula (III) is used as the B-oxalato compound in a preferred embodiment. A preferred example thereamong is the lithium bis(oxalato)borate (LiBOB) represented by formula (I). A strong and highly stable coat can be formed at the negative electrode active material surface using LiBOB. The degradation reactions of the nonaqueous electrolyte in subsequent charge-discharge cycles can be favorably inhibited as a consequence and the effects from the application of the present invention can then be exhibited at even higher levels.

The appropriate amount of B-oxalato compound addition can vary as a function of, for example, the type and properties (for example, the particle diameter and specific surface area) of the negative electrode active material, the particle structure, and the surface configuration. As a general matter, and assuming that other conditions (e.g., the type and particle structure of the active material) remain the same, the appropriate amount of B-oxalato compound addition will increase as the particle diameter declines and/or as the specific surface area grows larger. As a consequence, the amount of B-oxalato compound addition is not particularly limited; however, if this amount is too low, the coat formed at the negative electrode active material surface thins to the point that the durability of the battery (storage characteristics and cycle characteristics) may decline. When, on the other hand, the amount of addition is too large, the coat formed at the negative electrode active material surface thickens to the point that the resistance may increase accompanying charge-discharge. Accordingly, this amount of addition, expressed per unit mass of the negative electrode active material, is preferably, for example, at least 1 μmol/g (typically at least 3 μmol/g, for example, at least 5 μmol/g) and not more than 500 μmol/g (typically not more than 200 μmol/g, for example, not more than 100 μmol/g). A coat can be formed in a desirable amount on the negative electrode active material surface as a whole when this amount of addition is satisfied. Due to this, the effects from the addition of the B-oxalato compound are even more favorably developed and the durability and output characteristics can then be caused to co-exist at even higher levels for both.

Moreover, when the total amount of the B-oxalato compound in the battery is too large, this compound may precipitate in the operating temperature range for the battery (for example, 0° C. to −50° C.) and/or the internal resistance of the battery may increase. Due to this, when the B-oxalato compound is added to the nonaqueous electrolyte, the amount of addition, expressed with reference to the total amount of the nonaqueous electrolyte, is preferably, for example, at least 0.005 mol/L (typically at least 0.01 mol/L) and not more than 0.1 mol/L (typically not more than 0.05 mol/L, for example, not more than 0.03 mol/L). The effects of the present invention can be more favorably exhibited in the indicated range and an even higher battery performance can then be realized.

This compound is typically incorporated in the nonaqueous electrolyte (or in the nonaqueous solvent used for the nonaqueous electrolyte) and added in this condition to the battery case. Or, it may also be directly added (for example, by coating) to a structural member of the battery other than the nonaqueous electrolyte, for example, an electrode (for example, the negative electrode) or the separator.

Insofar as the effects of the present invention are not significantly impaired, the herein disclosed nonaqueous electrolyte may also contain components other than the nonaqueous solvent, supporting salt, and B-oxalato compound that have been described in the preceding. Such an optional component can be exemplified by various additives, e.g., a coat-forming material other than the B-oxalato compound (for example, vinylene carbonate (VC), vinylethylene carbonate (VEC), and fluoroethylene carbonate (FEC)), a compound that generates a gas during an overcharging event (for example, biphenyl (BP) and cyclohexylbenzene (CHB)), and materials capable of functioning as a dispersing agent or thickener.

After fabrication as described above, the battery (assembled battery) is typically subjected to a charging process under prescribed conditions. This charging process causes the B-oxalato compound to degrade, thereby forming a coat originating from the B-oxalato compound on the surface of the negative electrode active material. The interface between the surface of the negative electrode (negative electrode active material) and the nonaqueous electrolyte is stabilized by this coat, and as a result further degradation of the nonaqueous electrolyte component can be stopped and the durability of the battery can be improved.

The voltage between the positive and negative electrode terminals in the charging process (typically the maximum attained voltage) also varies as a function, for example, of the electrode materials used (the active materials), the nonaqueous electrolyte, and so forth, but it must be established so at least the potential of the negative electrode (vs. Li/Li$^+$) is fallen below the reduction potential (vs. Li/Li$^+$) of the B-oxalato compound. In a preferred embodiment, the charging process is carried out to at least 0.05 V (typically at least 0.1 V, for example, at least 0.3 V and particularly 0.5 V) lower than the reduction potential of the B-oxalato compound. When, on the other hand, the voltage between the positive and negative electrode terminals (typically the maximum attained voltage) is too high, this may have a negative influence on the battery performance, for example, it may promote degradation reactions by the nonaqueous electrolyte. Due to this, it is preferably set so as to not significantly exceed the upper limit voltage for the battery. For example, for a battery in which the upper limit voltage is 4.1 V, the voltage between the positive and negative electrode terminals in the charging process can be at least 2 V and not more than 4.1 V (typically at least 3.5 V and not more than 4.1 V).

Adjustment of the voltage can be carried out, for example, by constant current charging (CC charging), in which charging is carried out at a constant current of at least 1.5 C (typically at least 1.5 C and not more than 10 C, for example, at least 1.5 C and not more than 5 C) until the voltage between the positive and negative electrode terminals reaches a prescribed value after the start of charging. In a preferred embodiment it is carried out by constant current, constant voltage charging (CCCV charging), in which charging is carried out at a constant current of at least 1.5 C (typically at least 1.5 C and not more than 10 C, for example, at least 1.5 C and not more than 5 C) until the voltage between the positive and negative electrode terminals reaches a prescribed value after the start of charging, and additionally at a constant voltage for a prescribed period of time. Doing this enables a more stable formation of a favorable amount of the coat on the surface of the negative electrode active material. A coat having a lower resistance than heretofore can be formed by having the charging rate be at least 1.5 C. In addition, a favorable degradation of the B-oxalato compound can be achieved by having the charging rate be no more than 10 C (for example, not more than 5 C), resulting in the stable formation of a strong, fine, and dense coat on the surface of the negative electrode active material. As a consequence, this production method makes it possible to adjust the boron atom ratio ($B_A/B_M$) to a favorable value and thereby enables the production of a battery having an excellent durability and excellent output characteristics.

The common general technical knowledge in the prior art, such as, for example, Patent Literature 1, was that the charging rate in the charging process (typically the initial charging process) had to be set at a relatively low value. This value is typically 0.1 C to 1 C and, for example, is set at 1 C in Patent Literature 1. Thus, the charging process has not heretofore been carried out at a charging rate higher than 1 C. This is because a goal of the charging process is to form a coat on the negative electrode active material surface. That is, it was previously thought that the coat to be formed could be made finer, denser, and stronger by forming the coat gradually at a low charging rate. Thus, the value of $B_A/B_M$ in the prior art is typically about 0.2 and is at most 0.4 and cannot be higher than this. The idea of seeking to lower the battery resistance by controlling $B_A/B_M$ by adjusting the charging process conditions is also not present in the prior art. Special process conditions of some type are necessary in order to realize the herein disclosed $B_A/B_M$.

In a preferred embodiment, this charging process includes a first charging process, in which charging is carried out for a prescribed period of time at a prescribed charging rate set within the range described above for the charging rate; and a second charging process, in which charging is carried out to a prescribed voltage at a charging rate higher than in the first charging process. By using two stages for the charging process, preferred values can be established for both the conditions for forming the coat that is formed in the region proximal to the negative electrode active material and the conditions for forming the coat that is formed in the region separated from the negative electrode active material (the outermost surface region). Thus, setting the charging rate to a lower rate in the first charging process makes it possible to form a fine and dense (high-density) coat at the negative electrode active material surface. The battery can be provided with a high durability as a result. In addition, a coat with a relatively low density (sparse) can be formed by establishing a higher value for the charging rate in the second charging process. Due to this, charge carrier movement associated with charge-discharge is made smoother than heretofore and, for example, high output characteristics can be exhibited even in a low-temperature environment. The effects of the present invention can be exhibited at even higher levels as a consequence.

In a preferred embodiment, the charging rate in the second charging process is set to a value that is at least 1.5-times and not more than 3-times that in the first charging process. A battery that has an even more significantly reduced resistance and thus even better output properties can be produced when the difference between the charging rates is in this range. The effects from the application of the present invention can then be exhibited at an even higher level.

The aforementioned charging process may be carried out a single time, or a charge-discharge procedure may be carried out repetitively, for example, two or more times. In addition, another procedure (for example, loading with pressure by bundling, exposure to ultrasound) may be used in combination therewith within a range in which a significant negative influence is not exercised on battery performance.

For the herein disclosed nonaqueous electrolyte secondary battery, the B-oxalato compound should be contained within the battery case at least immediately after battery fabrication (i.e., in the so-called assembled battery state), after which all or a portion of the B-oxalato compound may undergo modification (ionization, degradation, and so forth). As previously noted, the major portion of the B-oxalato compound present immediately after battery fabrication undergoes reductive degradation on the surface of the negative electrode active material due to the charging process and can undergo bonding (attachment) by conversion into a boron (B) atom-containing coat on the negative electrode active material. Accordingly, the B-oxalato compound itself does not necessarily remain present in the present invention in a battery for which time has passed after battery fabrication (for example, the battery after the charging process).

Figure 2:
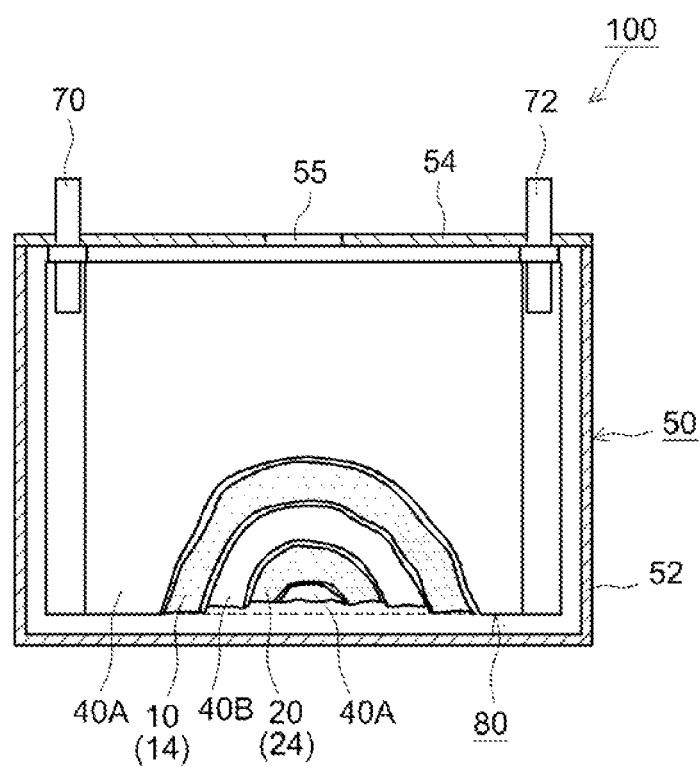
FIG. 2 is a diagram that schematically shows the cross-sectional structure on the II-II line of the nonaqueous electrolyte secondary battery of FIG. 1.

While not intended as a particular limitation, the example will be taken up—as a schematic structure of a nonaqueous electrolyte secondary battery according to an embodiment of the present invention—of a nonaqueous electrolyte secondary battery (a cell) having a configuration in which a flat-wound electrode assembly (a wound electrode assembly) and the nonaqueous electrolyte are housed in a container having a flat rectangular parallelepiped shape (rectangular shape); this schematic structure is shown in FIGS. 1 and 2. In the figures considered below, the same reference numbers are assigned to members locations that exercise the same function, and repetitive explanations are either omitted or abbreviated. The dimensional relationships (length, width, thickness, and so forth) in the individual figures do not reflect actual dimensional relationships.

FIG. 1 is a perspective diagram that schematically shows the outer shape of a nonaqueous electrolyte secondary battery 100 according to an embodiment of the present invention. FIG. 2 is a longitudinal cross-sectional diagram that schematically shows the structure along the II-II line of the nonaqueous electrolyte secondary battery shown in FIG. 1.

As shown in FIGS. 1 and 2, the nonaqueous electrolyte secondary battery 100 according to this embodiment is provided with a wound electrode assembly 80 and a battery case (outer container) 50. This battery case 50 is provided with a battery case main body 52, which has a flat rectangular parallelepiped shape (rectangular shape) and is open at the upper end, and with a lid 54, which closes off this opening. A positive electrode terminal 70, which electrically connects to the positive electrode sheet of the wound electrode assembly 80, and a negative electrode terminal 72, which electrically connects to the negative electrode sheet of the same electrode assembly, are disposed in the upper side of the battery case 50 (i.e., the lid 54). A safety vent 55 is provided in the lid 54 for the purpose of releasing a gas generated within the battery case to the outside of the case.

The interior of the battery case 50 houses a nonaqueous electrolyte (not shown) and an electrode assembly (wound electrode assembly) 80 that has a configuration in which a long strip-shaped positive electrode sheet 10 and a long strip-shaped negative electrode sheet 20 are wound flat with long strip-shaped separator sheets 40A and 40B interposed therebetween. In addition, the positive electrode sheet 10 is formed with the positive electrode mixture layer 14 not disposed (or removed) at one edge along its length direction, thereby exposing the positive electrode current collector 12. Similarly, the wound negative electrode sheet 20 is formed with the negative electrode mixture layer 24 not disposed (or removed) at one edge along its length direction, thereby exposing the negative electrode current collector 22. A positive electrode current collector tab, which is attached to the exposed edge of the positive electrode current collector 12, and a negative electrode current collector tab, which is attached to the exposed edge of the negative electrode current collector 22, are electrically connected to the positive electrode terminal 70 and the negative electrode terminal 72, respectively.

FIG. 3 is a schematic diagram that shows the structure of the wound electrode assembly 80. As schematically shown in FIG. 3, in the stage prior to assembly the wound electrode assembly 80 according to this embodiment has a long strip-shaped sheet structure (electrode sheet). This wound electrode assembly 80 is formed into a flat shape by stacking long strip-shaped separator sheets 40A and 40B with a positive electrode sheet 10, provided by forming a positive electrode mixture layer 14 along the length direction of one side or both sides (typically both sides) of a long strip-shaped positive electrode current collector 12, and with a negative electrode sheet 20, provided be forming a negative electrode mixture layer 24 along the length direction of one side or both sides (typically both sides) of a long strip-shaped negative electrode current collector 22; winding in the length direction; and pressing flat from the side direction.

Figure 4:
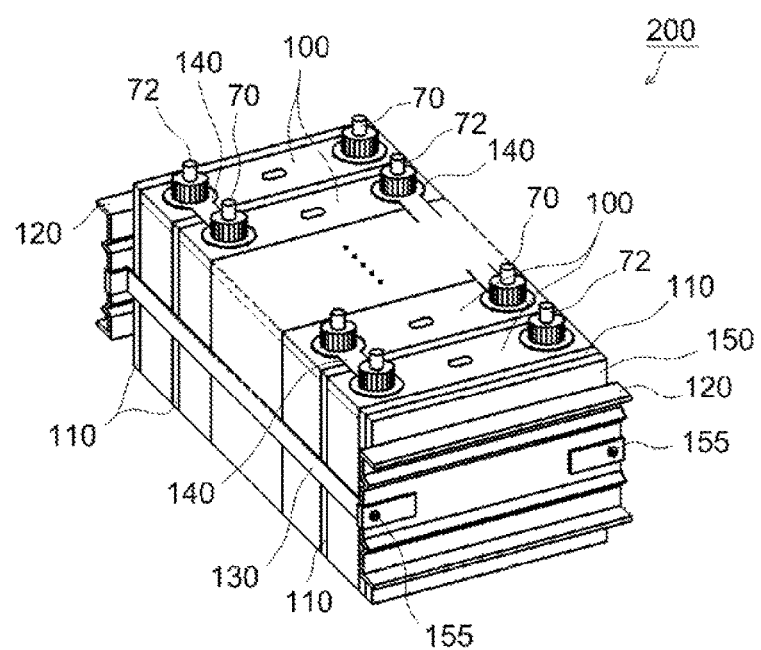
FIG. 4 is a perspective diagram that schematically shows a battery pack that combines a plurality of nonaqueous electrolyte secondary batteries (cells) according to an embodiment of the present invention.

FIG. 4 shows an example of a battery pack 200 in which nonaqueous electrolyte secondary batteries (cells) 100 are connected in series and/or parallel. The herein disclosed battery (cell) is characterized by having a higher energy density and a higher output density than conventional cells. As a consequence, a significantly higher battery performance can be exhibited by a battery pack in which a plurality of these cells are interconnected (typically in series). In the battery pack 200 in the configuration shown in FIG. 4, a plurality (typically at least 10 and preferably approximately 10 to 30, for example, 20) of the nonaqueous electrolyte secondary batteries (cells) 100 are arrayed in a direction (stacking direction) in which the wide sides of the battery cases 50 face each other, while being reversed from one to another such that their respective positive electrode terminals 70 and negative electrode terminals 72 alternate. Cooling plates 110 with a prescribed shape are sandwiched between the thusly arrayed cells 100. These cooling plates 110 function as heat-radiating members in order to efficiently dissipate the heat generated within the individual cells 100 during use and preferably have a shape that enables the introduction of a cooling fluid (typically air) between the cells 100 (for example, a shape in which a plurality of parallel grooves are disposed in the surface of a rectangular cooling plate and run perpendicularly from one edge thereof to the opposite edge). The cooling plate is advantageously made of a metal having an excellent thermal conductivity or a light, hard synthetic resin such as polypropylene and so forth.

A pair of end plates (retaining plates) 120 are disposed at the two ends of the thusly arrayed cells 100 and cooling plates 110. In addition, one or a plurality of sheet-shaped spacer members 150 may be sandwiched as a length adjustment means between the cooling plates 110 and the end plates 120. The thusly arrayed cells 100, cooling plates 110, and spacer members 150 are retained by the application of a prescribed retaining pressure in the stacking direction by a tightening retaining band 130 that is installed to run between the two end plates. More particularly, the cells and so forth are retained by the application of a prescribed retaining pressure in their array direction by fastening and fixing the end of the retaining band 130 to the end plate 120 using a screw 155. This also functions to apply the retaining pressure to the wound electrode assembly 80 housed within the battery case 50 of each cell 100. In addition, the positive electrode terminal 70 of one cell 100 is electrically connected by a connection member (a bus bar) 140 to the negative electrode terminal 72 of another adjacent cell 100.

A battery pack 200 having a desired voltage is constructed by this serial interconnection of the individual cells 100.

Figure 5:
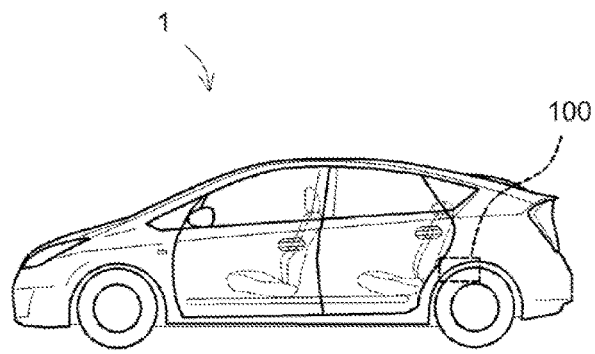
FIG. 5 is a diagram in side view that shows a vehicle (an automobile) that is provided with a nonaqueous electrolyte secondary battery according to an embodiment of the present invention.

The herein disclosed battery can be used for a variety of applications, but it is characterized by a favorable development of the effects from the addition of the B-oxalato compound and hence by a better battery performance (for example, the high-temperature durability and the output characteristics in a low-temperature environment) than heretofore. It can thus be favorably used in applications where a high durability and high output characteristics are required over a broad range of temperature environments (for example, a drive power source mounted in a vehicle 1 as shown in FIG. 5). The type of the vehicle 1 is not particularly limited, but can be exemplified by plug-in hybrid vehicles (PHV), hybrid vehicles (HV), electric vehicles (EV), electric trucks, electric scooters, electric motor-assisted bicycles, electric wheelchairs, and electric railways. While in such instances a battery pack 200 having a plurality of cells 100 connected in series and/or parallel may be used, a cell 10X may of course also be used by itself.

Several examples relating to the present invention are described below, but this should not be construed to mean that the present invention is limited to what is shown in these specific examples.

[Battery Fabrication]

$LiNi_{1/3}Co_{1/3}Mn_{1/3}O_2$ (LNCM) as a positive electrode active material powder, acetylene black (AB) as an electroconductive material, and polyvinylidene fluoride (PVdF) as a binder were introduced into a mixer in a mass ratio among these materials of LNCM:AB:PVdF=90:8:2, and a positive electrode active material slurry was prepared by mixing while adjusting the viscosity with N-methylpyrrolidone (NMP) to provide a solids fraction concentration (NV) of 50% by mass. This slurry was coated on both sides of a 15 μm-thick aluminum foil (positive electrode current collector) at an areal coverage of 11 mg/cm³ (per one side), and a positive electrode sheet (thickness=65 μm, electrode density=2.8 g/cm³) having a positive electrode mixture layer on the positive electrode current collector was then produced by drying followed by pressing.

A natural graphite having a particle diameter of 5 μm and a specific surface area of 3 m²/g was then prepared as the negative electrode active material. This natural graphite (C), a styrene-butadiene rubber (SBR) as a binder, and carboxymethyl cellulose (CMC) as a dispersing agent were introduced into a mixer in a mass ratio among these materials of C:SBR:CMC=98:1:1, and a negative electrode active material slurry was prepared by mixing while adjusting the viscosity with deionized water to provide a solids fraction concentration (NV) of 45% by mass. This slurry was coated on both sides of a long strip-shaped 10 μm-thick copper foil (negative electrode current collector) at an areal coverage of 7.5 mg/cm² (per one side), and a negative electrode sheet (thickness=78 μm, electrode density=1.4 g/cm³) having a negative electrode mixture layer on the negative electrode current collector was then produced by drying followed by pressing.

An electrode assembly was produced by winding the thusly fabricated positive electrode sheet and negative electrode sheet together with two separator sheets (the separator sheets used had a three-layer structure of polypropylene (PP) laminated on both sides of polyethylene (PE) and had a thickness of 20 μm, a pore size of 0.09 μm, and a porosity of 48% by volume) and forming into a flat shape. A positive electrode terminal and a negative electrode terminal were attached to the battery case lid and these terminals were welded, respectively, to the positive electrode current collector and negative electrode current collector exposed at the edges of the electrode assembly. The electrode assembly thusly connected to the lid was housed in the interior of the battery case through the opening therein and the lid was welded to the opening. Lithium bis(oxalato)borate (LiBOB) and a nonaqueous electrolyte (the nonaqueous electrolyte used was prepared by dissolving $LiPF_6$ at a concentration of 1 mol/L as the supporting salt in a mixed solvent containing ethylene carbonate (EC), dimethyl carbonate (DMC), and ethyl methyl carbonate (EMC) in a volumetric ratio of EC:DMC:EMC=1:1:1) were then introduced through an electrolyte solution fill port disposed in the lid. The LiBOB was added so as to provide 31 μmol/g with reference to the mass of the negative electrode active material used (this gave a concentration of 0.015 mol/L with reference to the nonaqueous electrolyte). A total of 30 nonaqueous electrolyte secondary batteries were fabricated in this manner.

[The Charging Process]

EXAMPLES 1 to 10

The batteries fabricated as described in the preceding were processed using different charging patterns. Thus, as shown in Table 1, in Examples 1 to 6 constant current charging (CC charging) was performed at the charging rate (current value) given in the corresponding column until the voltage between the positive and negative terminals reached 4.1 V; this was followed by constant voltage charging (CV charging) until the current value became 0.02 C. In Examples 7 to 10, CC charging was performed using the conditions shown by (1) followed by CCCV charging using the conditions shown by (2). Thus, after CC charging for the prescribed time at the charging rate shown in (1), CCCV charging was carried out under the conditions shown in (2) in the same manner as in Examples 1 to 6. The charging process was performed using 3 cells in each example (N=3).

TABLE 1

| | | conditions in the charging process | | |
|---|---|---|---|---|
| | charging method | charging rate (C) | charged voltage (V) | stop conditions |
| Example 1 | CCCV | 0.2 C | 4.1 V | 0.02 C cut |
| Example 2 | CCCV | 1.0 C | 4.1 V | 0.02 C cut |
| Example 3 | CCCV | 1.5 C | 4.1 V | 0.02 C cut |
| Example 4 | CCCV | 2.0 C | 4.1 V | 0.02 C cut |
| Example 5 | CCCV | 3.0 C | 4,1 V | 0.02 C cut |
| Example 6 | CCCV | 5.0 C | 4.1 V | 0.02 C cut |
| Example 7 | (1) CC | 0.2 C | — | 30 minutes |
| | (2) CCCV | 2 C | 4.1 V | 0.02 C cut |
| Example 8 | (1) CC | 1.0 C | — | 6 minutes |
| | (2) CCCV | 2 C | 4.1 V | 0.02 C cut |
| Example 9 | (1) CC | 2.0 C | — | 3 minutes |
| | (2) CCCV | 4 C | 4.1 V | 0.02 C cut |
| Example 10 | (1) CC | 2.0 C | — | 3 minutes |
| | (2) CCCV | 1 C | 4.1 V | 0.02 C cut |

After the completion of the charging process, one battery in each example was disassembled and the negative electrode was removed and the state of the B-oxalato compound distribution was analyzed by XAFS and ICP-AES. The two remaining batteries were used to evaluate the high-temperature storage characteristics and the low-temperature output characteristics (the low-temperature short-time output characteristics in this case).

[Evaluation of the State of the B-oxalato Compound Distribution]

<XAFS>

In order to prevent moisture-induced alteration of the sample, the process of disassembling the particular battery and extracting the negative electrode was performed in a glove box brought to a dew point of equal to or less than −80° C. The negative electrode was transferred in the glove box into a sample transport device that was not open to the atmosphere and was introduced into the measurement instrument (BL) in a state with the negative electrode kept out of contact with the atmosphere. The x-ray absorption spectrum (approximately 193 eV to 194 eV) of the tricoordinate boron (B) atom was measured on this negative electrode using the conditions given below. Using the resulting x-ray absorption spectrum, the peak intensity $B_A$ was determined by subtracting the baseline value from the peak value. The results are given in the corresponding column in Table 2 below.

measurement instrument: BL-12, Saga Prefectural Kyushu Synchrotron Light Research Center measured absorption edge: B-K edge (190 eV to 210 eV)

mirror used: M22 (180 eV to 550 eV)

slits: S1; 10 μm, S2; 10 μm

<ICP-AES>

The removed negative electrode was lightly washed 2 or 3 times with the nonaqueous solvent (EC:DMC:EMC=1:1:1) used for the nonaqueous electrolyte. The negative electrode (negative electrode mixture layer) was punched to a selected size (1 cm² here) to obtain the measurement sample for ICP-AES analysis. This measurement sample was heated and dissolved in an acid solvent (sulfuric acid was used in the present case), and the boron (B) atom content (μg) was measured by ICP-AES analysis of the resulting solution. The amount $B_M$ (μg/cm²) of boron (B) atoms per unit area was then determined by dividing the obtained value by the area (cm²) of the measurement sample. The results are shown in the corresponding column in Table 2 below.

Figure 6:
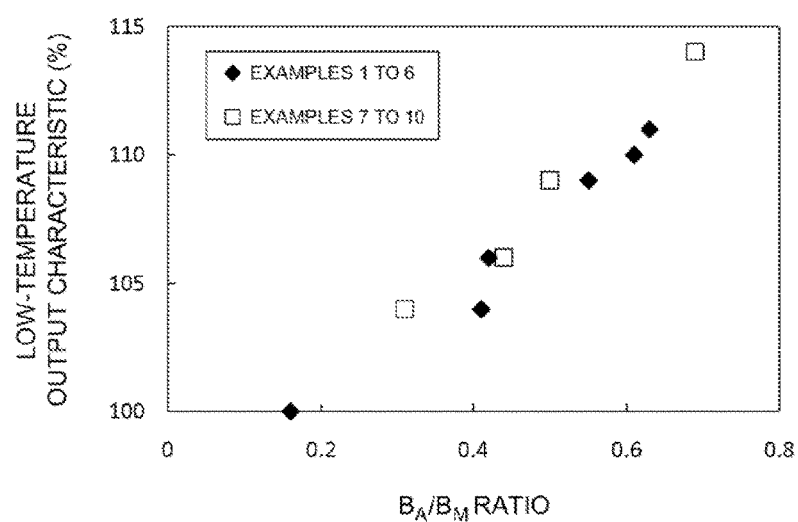
FIG. 6 is a graph that shows the relationship between the boron (B) atom ratio ($B_A/B_M$) in the coat and the low-temperature output characteristics (relative value).

The ratio ($B_A/B_M$) between the $B_A$ measurement result by XAFS and the $B_M$ measurement result by ICP-AES is also given in Table 2 and FIG. 6.

TABLE 2

| | boron (B) atom originating from LiBOB | | | battery performance | |
|---|---|---|---|---|---|
| | intensity $B_A$ by XAFS | Bm (μg/cm²) by ICP-AES | $B_A/B_M$ | storage characteristics (%) | output characteristics (%) |
| Example 1 | 0.012 | 0.075 | 0.16 | 100 | 100 |
| Example 2 | 0.032 | 0.079 | 0.41 | 100 | 104 |
| Example 3 | 0.044 | 0.080 | 0.55 | 100 | 109 |
| Example 4 | 0.049 | 0.078 | 0.63 | 100 | 111 |
| Example 5 | 0.047 | 0.077 | 0.61 | 100 | 110 |
| Example 6 | 0.033 | 0.078 | 0.42 | 100 | 106 |
| Example 7 | 0.023 | 0.075 | 0.31 | 100 | 104 |
| Example 8 | 0.034 | 0.077 | 0.44 | 100 | 106 |
| Example 9 | 0.052 | 0.075 | 0.69 | 100 | 114 |
| Example 10 | 0.037 | 0.074 | 0.5 | 100 | 109 |

As shown in Table 2, among Examples 1 to 6, in which a fixed charging rate was employed, $B_A/B_M$ assumed its highest value when the charging rate was 2 C (Example 4). Thus, initially the value of $B_A/B_M$ gradually grew larger as the charging rate increased and assumed a maximum at 2 C. The value of $B_A/B_M$ then, conversely, grew smaller when 2 C was exceeded. In addition, the value of $B_A/B_M$ was larger in Example 9, where the charging rate was changed (increased) during the process, than in Examples 4 to 6, where the charging rate was fixed. These results demonstrate that the status of the coat formed at the negative electrode active material surface (typically the $B_A$ value) is substantially influenced by the conditions during the charging process (for example, the charging procedure and the charging rate).

[Evaluation of the (High-Temperature) Storage Characteristics]

For each of the batteries in Examples 1 to 10, three charge-discharge cycles (here, the following charge-discharge was carried out three times: a step of constant current charging to 4.1 V at a current of 4 A, and a step of constant current discharge to 3.0 V at a current of 4 A) were carried out at 25° C., and the discharge capacity at the third cycle was taken to be the initial capacity (i.e., the state in which the state of charge (SOC) was 100%) of the particular battery. In addition, after adjusting the voltage by carrying out a charging process that brought the particular battery to an 80% SOC, the battery was held for 720 hours (approximately 30 days) in a high-temperature environment at 60° C. After the high-temperature storage, the discharge capacity after high-temperature storage was determined by again subjecting the battery to charge-discharge using the same conditions as in the initial capacity measurement described above. In each example, normalization was performed by dividing the discharge capacity after high-temperature storage by the discharge capacity in Example 1 and multiplying by 100. The results are shown in the corresponding column in Table 2.

As shown in Table 2, the capacity ratio held at 100% in all of Examples 1 to 10, which indicated excellent storage characteristics. That is, within the range of the examples given here, almost no change was seen in the storage characteristics as a function of the charging process conditions or the $B_A/B_M$ value. Accordingly, it is thought that, under the charging process conditions in all of Examples 1 to 10, LiBOB could undergo a favorable degradation and could form a stable coat at the negative electrode active material surface, and that as a consequence the subsequent degradation of, inter alia, the nonaqueous electrolyte was inhibited.

[Evaluation of the (Low-temperature) Output Characteristics]

The batteries in Examples 1 to 10 were first subjected to CCCV charging in a 25° C. environment to adjust to a 30% SOC. The batteries in this SOC were held at quiescence for at least 5 hours in a thermostat set to −30° C., followed by discharge at a constant power (CP) of 40 W, 60 W, 80 W, and 100 W, and at each discharge power the time (discharge time in seconds) was measured from the start of discharge until the battery voltage had dropped to 2.5 V (discharge cut voltage). This discharge time in seconds was plotted versus the discharge power (W), and the power value at which the discharge time in seconds was 2 seconds was determined (that is, the power at which discharge to 2.5 V occurs in 2 seconds from a 30% SOC at −30° C.); this was taken to be the low-temperature (two-second) output (low-temperature short-time output) of the particular battery. The results, provided by normalizing this two-second output value by the results for Example 1, are shown in the corresponding column in Table 2.

As shown in Table 2, among Examples 1 to 6, in which a fixed charging rate was employed, the output characteristic assumed its highest value when the charging rate was 2 C (Example 4). That is, the output characteristic gradually increased as the charging rate increased to assume a maximum when the charging rate was 2 C. In addition, when this charging rate was exceeded, the output characteristic assumed a modest declining trend. In addition, among all of Examples 1 to 10, the output characteristic was highest in Example 9, in which the charging rate was raised during the process, i.e., this was the battery with the best output characteristic. This result demonstrates that the output characteristics of this batter), vary significantly as a function of the charging process conditions (for example, the charging procedure and the charging rate).

The relationship between $B_A/B_M$ (horizontal axis) and the low-temperature output characteristic (vertical axis) is shown in FIG. 6 for the results from Examples 1 to 10. As shown in FIG. 6, results were obtained wherein the low-temperature output characteristic was higher (better) at larger values of $B_A/B_M$. More particularly, among the batteries of Examples 1 to 6, for which the charging rate was fixed, it was shown that an approximately 10% improvement in the low-temperature characteristic over Example 1 could be obtained when the charging rate during the charging process was at least 1.5 C (i.e., $0.55 \leq B_A/B_M \leq 0.63$ in Examples 3 to 5). It was also shown that Example 9, in which the charging rate was raised during the process, provided the highest low-temperature output characteristic of all and was able to provide an approximately 15% improvement in the low-temperature characteristic over Example 1. It was thus shown that significantly better output characteristics could be generated, even in a low-temperature environment, by using $0.5 \leq B_A/B_M$ ($0.5 \leq B_A/B_M \leq 0.7$ in the examples).

Based on the preceding results, the following is thought with regard to the relationship between the conditions in the charging process and coat formation. Thus, in the initial stage of the charging process, the LiBOB present in the vicinity of the negative electrode (typically within the negative electrode mixture layer) prior to charging undergoes reductive degradation at the negative electrode and can form a stable coat on the surface of the negative electrode active material. The interface between the negative electrode active material and the nonaqueous electrolyte is stabilized by this coat and the durability of the battery can be improved as a result. Accordingly, it is thought that a finer and denser (higher density) coat can be formed at the negative electrode active material surface by carrying out the charging process in the initial stage of charging at a relatively moderate rate. In addition, when the LiBOB in the vicinity of the negative electrode has been consumed by the reductive degradation reactions, the LiBOB present in the vicinity of the positive electrode and separator prior to charging diffuses to the negative electrode due to mass balancing. Beyond the initial stage of the charging process, the diffused LiBOB, the nonaqueous solvent, which has a higher reduction potential than this LiBOB, the trace moisture admixed in the battery case, and so forth, undergo degradation to form a so-called mixed coat on the fine and dense coat. Accordingly, with regard to the formation of this mixed coat, it is thought that, by setting the charging rate to a value higher than that indicated above, a coat can be formed that has a relatively low density (a sparse coat), i.e., that has a reduced resistance. It is thought that the charge migration associated with charge-discharge thus proceeds smoothly with the herein disclosed battery, which can then realize high output characteristics even in a low-temperature environment.

As described in the preceding, the present invention makes it possible for the storage characteristics and the output characteristics to co-exist at even higher levels for both.

The present invention has been described in detail hereinabove, but the embodiments and examples provided hereinabove are nothing more than examples, and the herein disclosed invention encompasses various modifications and alterations of the specific examples that have been provided in the preceding.

INDUSTRIAL APPLICABILITY

The herein disclosed battery is characterized by a favorable development of the effects from coat formation at the active material surface and hence by the ability to realize a better durability (and particularly high-temperature storage characteristics) and better output characteristics (and particularly the low-temperature output characteristics) than heretofore. By exploiting these characteristic features, it can be particularly advantageously used in applications where there are demands on the durability and output characteristics over a broad range of temperature environments. Such applications can be exemplified by use as the power source for a motor (the drive power source) mounted in a vehicle, for example, plug-in hybrid vehicles (PHV), hybrid vehicles (HV), electric vehicles (EV), electric trucks, electric scooters, electric motor-assisted bicycles, electric wheelchairs, and electric railways.

REFERENCE SIGNS LIST 1 automobile (vehicle)
10 positive electrode sheet (positive electrode)
12 positive electrode current collector
14 positive electrode mixture layer
20 negative electrode sheet (negative electrode)
22 negative electrode current collector
24 negative electrode mixture layer
40A, 40B separator sheet (separator)
50 battery case
52 case main body
54 lid
70 positive electrode terminal
72 negative electrode terminal
80 wound electrode assembly
100 nonaqueous electrolyte secondary battery
110 cooling plate
120 end plate
130 retaining band
140 connection member
150 spacer member
155 screw
200 battery pack

The invention claimed is:

1. A nonaqueous electrolyte secondary battery in which an electrode assembly in which a positive electrode having a positive electrode active material and a negative electrode having a negative electrode active material are disposed facing each other,
   a nonaqueous electrolyte, and
   a boron (B) atom-containing oxalato complex compound are housed in a battery case, wherein
   a coat containing boron (B) atoms that originate from the oxalato complex compound is formed on the surface of the negative electrode active material, and
   a ratio on the surface of the negative electrode active material between an amount $B_M$ ($\mu g/cm^2$) of the boron atom, as measured based on inductively coupled plasma-atomic emission spectroscopy (ICP-AES), and an intensity $B_A$ for a tricoordinate boron (B) atom, as measured based on x-ray absorption fine structure (XAFS) analysis, is $0.5 \leq B_A/B_m \leq 1.0$.

2. The nonaqueous electrolyte secondary battery according to claim 1, wherein an amount of addition of the boron (B) atom-containing oxalato complex compound is at least 3 μmol/g and not more than 200 μmol/g with reference to the negative electrode active material.

3. The nonaqueous electrolyte secondary battery according to claim 1, wherein the boron (B) atom-containing oxalato complex compound is lithium bis(oxalato)borate.

4. The nonaqueous electrolyte secondary battery according to claim 1, wherein the negative electrode active material is a particulate and a specific surface area of this particulate negative electrode active material based on a BET method is at least 1 m²/g and not more than 10 m²/g.

5. A battery pack comprising a combination of a plurality of nonaqueous electrolyte secondary batteries according to claim 1.

6. The nonaqueous electrolyte secondary battery according to claim 1, wherein the coat containing boron (B) atoms that originate from the oxalato complex compound is formed on the surface of the negative electrode active material by carrying out a charging process such that a voltage between the positive electrode and the negative electrode reaches a prescribed value, wherein a charging rate in the charging process is set as at least 1.5 C and not more than 5 C.

7. The nonaqueous electrolyte secondary battery according to claim 6, wherein the charging process includes:
   a first charging process of charging for a prescribed amount of time at a prescribed charging rate set within the charging rate range; and
   a second charging process of charging to a prescribed voltage at a charging rate that is higher than that in the first charging process.

8. The nonaqueous electrolyte secondary battery according to claim 7, wherein the charging rate in the second charging process is set at a value that is at least 1.5-times and not more than 3-times the charging rate in the first charging process.

* * * * *